United States Patent [19]
Lhuillier et al.

[11] Patent Number: 5,122,874
[45] Date of Patent: Jun. 16, 1992

[54] CODING ARRANGEMENT INCLUDING VARIABLE LENGTH ENCODER INCORPORATING A BUFFER FILLING CONTROL BASED ON AVERAGED BLOCK QUALITY, AND AN ASSOCIATED DECODING DEVICE

[75] Inventors: Jean-Jacques Lhuillier, Saint Maur; Philippe Guichard, Verrieres Le Buisson, both of France

[73] Assignee: U.S. Philips Corporation, New York, N.Y.

[21] Appl. No.: 604,736

[22] Filed: Oct. 22, 1990

[30] Foreign Application Priority Data

Oct. 27, 1989 [FR] France .................. 89 14141

[51] Int. Cl.⁵ .................................................. H04N 7/12
[52] U.S. Cl. ....................................................... 358/133
[58] Field of Search ............. 358/133, 135, 136, 426, 358/261.1, 432, 433; 382/56

[56] References Cited

U.S. PATENT DOCUMENTS

| | | | |
|---|---|---|---|
| 4,831,659 | 5/1989 | Miyaoka et al. | 358/433 |
| 4,868,641 | 9/1989 | Modaresse | 358/133 |
| 5,010,401 | 4/1991 | Murakami et al. | 358/133 |

Primary Examiner—Victor R. Kostak
Attorney, Agent, or Firm—Michael E. Marion

[57] ABSTRACT

A coding arrangement which includes a coder for variable-length encoding provided with a quality control to determine the different coding characteristics, a buffer store for receiving the coded information originating from the said coder and for recovering them at an output terminal with a fixed rate thanks to the presence of a regulating circuit. The regulating circuit uses the average quality of packets of information blocks to control a filler circuit which supplies a fill quantity of the coded information. A correction circuit supplies a corrected quality value by correcting the average quality as a function of the fill quantity.

16 Claims, 7 Drawing Sheets

CODING ARRANGEMENT INCLUDING VARIABLE LENGTH ENCODER INCORPORATING A BUFFER FILLING CONTROL BASED ON AVERAGED BLOCK QUALITY, AND AN ASSOCIATED DECODING DEVICE

BACKGROUND OF THE INVENTION

The present invention relates to a coding arrangement including a variable-length encoder having a quality control to determine different coding characteristics, the arrangement comprising an input for receiving information components to be encoded and which are provided in the form of packets of information blocks to be applied to said coder, a buffer store receiving the coded information outputed by the said coder and to produce them at an output terminal thereof with a fixed rate, and a regulating circuit for defining for each block a quality as a function of on the one hand the real number of bits utilized for coding each block and on the other hand a residual quantity which defines the number of bits contained in the buffer store after coding of each packet.

Such an arrangement is advantageously used more specifically in the field of digital television. Thus, each packet can represent a picture and each block a zone of this picture containing a set of picture elements.

This is described in the European Patent Application no. 0.310 175. To profit fully from the advantages of the variable-length encoder, it is advantageous to utilize a large-capacity buffer store which can thus take up considerable inequalities in the length of the encoded words. However, when one wants to record such encoded images on magnetic tape, it is a requirement that each picture is coded with a substantially constant number of bits so as to occupy a fixed space on the magnetic tape. This facilitates the fast search of a recorded sequence of pictures. The known arrangements are therefore limited to the use of a buffer store whose capacity depends on the tolerance permitted to this space. This is of necessity a low capacity.

SUMMARY OF THE INVENTION

The present invention has for its object to provide an arrangement of the type defined in the opening paragraph which satisfies the said requirement while still using a buffer store having a large capacity. To that end, the arrangement is characterized, in that the regulating circuit comprises a quality circuit to determine an average quality of each packet of information blocks, a calculating circuit to provide for each block the number of bits corresponding to the said average quality, an accumulator circuit for accumulating the differences between the number furnished by the calculation circuit and the real number, a filler circuit for supplying a fill quantity representing the ratio between the accumulated differences and the residual quantity and a correction circuit for supplying a corrected quality value by correcting the average quality as a function of the fill quantity.

The basic idea of the invention is based on the hypothesis that for a given block the product of the real number and the value of the inverse of the quality is constant. In the sequel of this description it will be described how this idea is utilized.

The invention also relates to a decoding device associated with the coding arrangement.

BRIEF DESCRIPTION OF THE DRAWING

The following description which is given by way of non-limitative example with reference to the accompanying drawings will make it better understood how the invention can be put into effect.

DETAILED DESCRIPTION OF A PREFERRED EMBODIMENT OF THE INVENTION

The embodiment described hereinafter relates to the processing of television pictures as regards their recording on magnetic tape.

Figure 1:
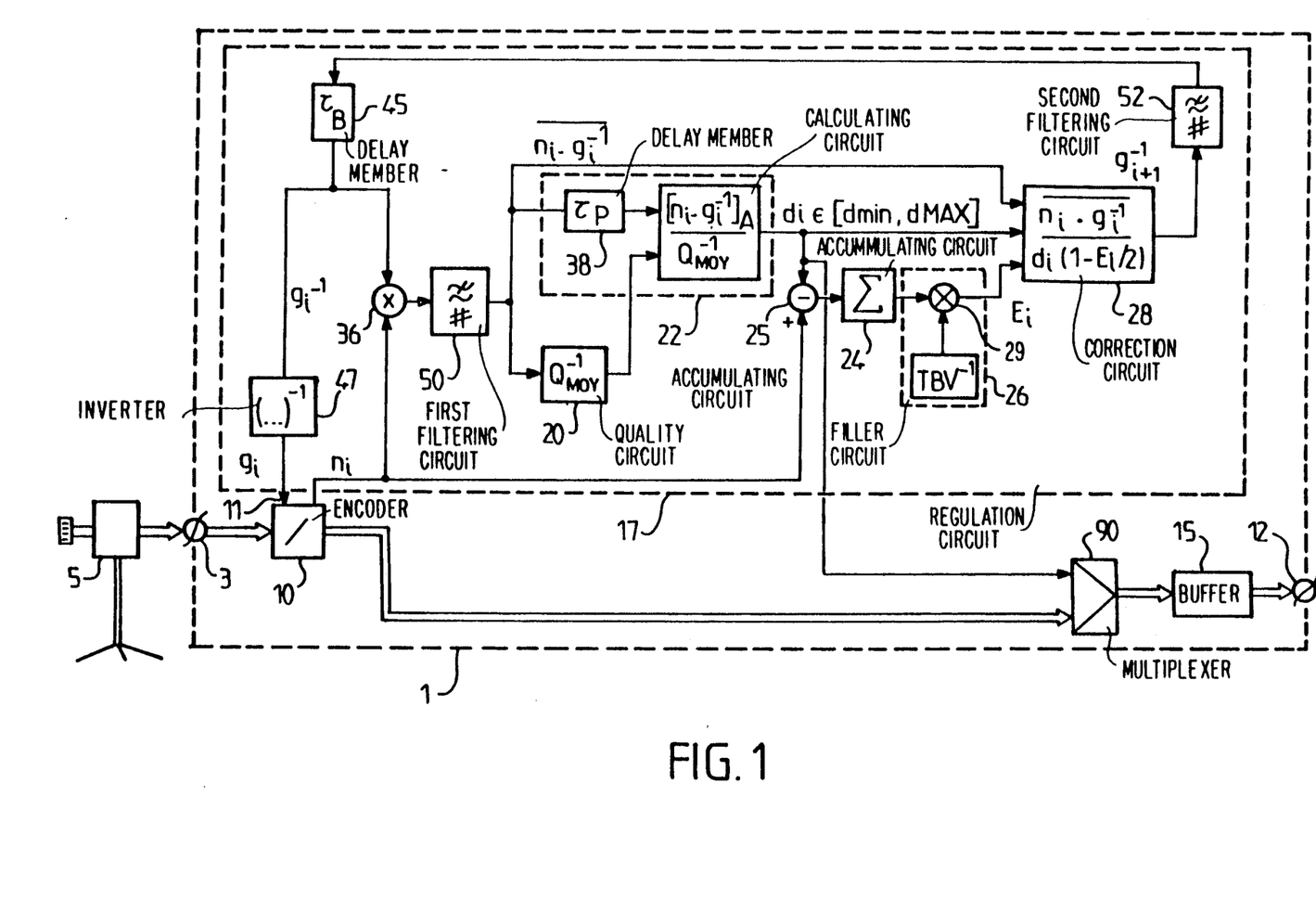
FIG. 1 shows a coding arrangement in accordance with the invention.
Figure 2:
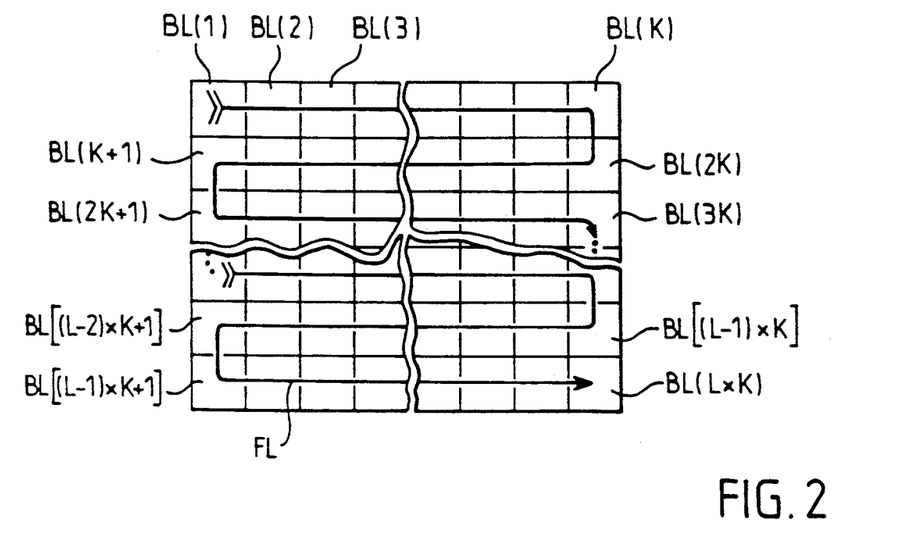
FIG. 2 shows the division of a picture into blocks.

The coding arrangement shown in FIG. 1 is given the reference numeral 1. Its input terminal 3 receives the information components in the digital form of a picture originating, for example, from a television camera 5. These information components are first processed by an encoder 10 of a type similar to that described in the European Patent Application 0 310 175 mentioned in the foregoing. This encoder codes picture blocks BL(i) whose number is represented by "i". The distribution of these blocks is shown in FIG. 2. Each of these blocks is coded with a real number $n_i$ of bits as a function of a parameter $q_i$, denoted quality applied to the control input 11 of the encoder 10. For a given block, the larger the parameter $q_i$ the higher the number $n_i$ will be. As from the output terminal 12, the bits are supplied with a fixed rate $t_0$. A buffer store 15 is present which takes up the fluctuation of the numbers $n_i$. A regulation circuit 17 supplies the values of the parameters $q_i$ to ensure that the store 15 is neither overloaded nor emptied. The maximum number of remaining bits may be equal to the capacity TBM of the memory 15.

FIG. 2 shows a distribution into L lines and K columns of the blocks BL(i) wherein i consequently varies from 1 to K×L. As a practical example, each block contains 16×16 picture elements, K=50 and L=40.

Figure 3:
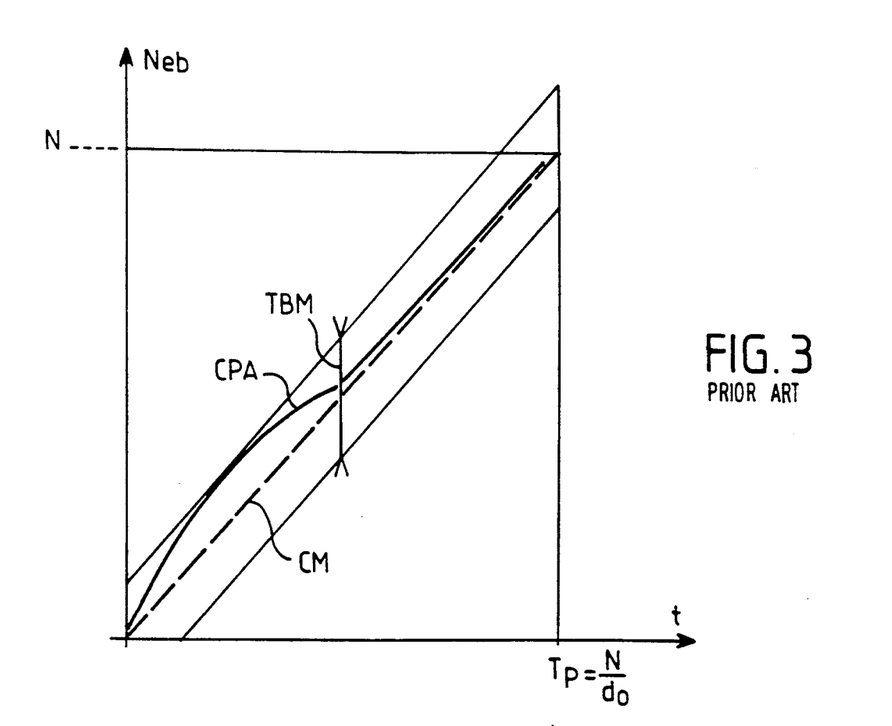
FIG. 3 shows as a function of time the development of the number of bits supplied by the coder, in accordance with the prior-art techniques.

For a proper understanding of the invention, it is shown in FIG. 3 how the prior-art regulating circuits function. At the abscissa the time "t" is plotted and at the ordinate "Neb" the number of bits. N bits are supplied for a picture having a duration $T_p$ ($T_p = N/d_0$). The broken line CM represents the development of the number of bits supplied from the terminal 12 and the solid line curve CPA represents the development of the number of bits applied to the input of the buffer store 15.

The dimension TBM of the buffer store 15 gives the permissible variation of the number of bits on either side of the curve CM. This dimension represents the maximum residual value at the end of a picture.

The curve CPA can illustrate the fact that the analysed picture includes, at the beginning of the analysis, zones showing many details and thereafter zones without details, so that if the first detailed zones are coded with a satisfactory quality, the next zones will be so with a quality which is increasingly less satisfactory. The zones without details then following are then encoded with an unnecessarily high quality.

To avoid this type of drawback, the regulation circuit comprises, according to the invention:
- a quality circuit 20 which supplies a value $Q^{-1}{}_{MOY}$ which is the inverse of the quality $Q_{MOY}$,
- a calculating circuit 22 which for each block BL(i) produces a number di which is the desired number of bits for coding this block with the quality $Q_{MOY}$,
- an accumulating circuit 24 for accumulating the differences $(n_i - d_i)$, effected by a subtracting member 25,
- a filler circuit 26 to furnish a fill quantity $E_i$ representing the ratio between the accumulated differences and the residual quantity TBV required at the end of the analysis of a picture, and
- a correction circuit 28 for producing a corrected quality value by correcting the average quality as a function of the fill quantity.

Figure 4:
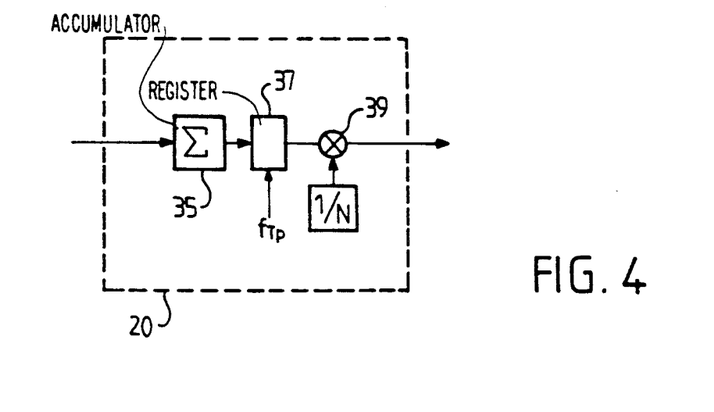
FIG. 4 is a detailed representation of a circuit of the arrangement of FIG. 1.

As has been stated in the foregoing, the invention is based on the fact that the quantity $n_i q_i^{-1}$ is a constant. The average quality circuit 20 calculates an average quality for a picture and this quality is assumed to be valid for the following picture. This circuit is shown in detail in FIG. 4. It is comprised of an accumulator 35 for accumulating the quantity $n_i q_i^{-1}$ provided by a multiplying member 36 (FIG. 1) and a register 37 for storing during the period $T_p$ of a picture the accumulated quantity during the preceding picture. A multiplying member 39 multiplies the quantity contained in the register 37 by 1/N. At the output of the multiplying member the mean quantity $Q^{-1}{}_{MOY}$:

$$Q^{-1}_{MOY} = \frac{\sum\limits_{i=1}^{B} n_i q_i^{-1}}{N} \quad (1)$$

is obtained wherein B is the number of blocks forming an N-element picture; This formula (1) derives from the said hypothesis which renders it possible to write for each block BL(i):

$$d_i \cdot Q^{-1}_{MOY} = n_i q_i^{-1} \quad (2)$$

while taking the sum of the B blocks of a N-element picture $$Q^{-1}_{MOY} \cdot \sum\limits_{i=1}^{B} d_i = \sum\limits_{i=1}^{B} n_i q_i^{-1}$$

and to satisfy the said requirement of supplying N bits during a period $T_p$:

$$\sum\limits_{i=1}^{B} d_i = N$$

hence the formula (1).

The circuit 22 which supplies the quantity $d_i$ takes advantage of the relation (2). But here the product $[n_i q_i^{-1}]_A$ supplied from the output of a delay member 38 which produces a delay $T_p$ relates to the preceding picture.

Since $Q_{MOY}$ is also calculated from the preceding picture, $d_i$ is a good value with which $n_i$ must be aligned, assuming that the consecutive pictures are similar.

The filler circuit 26 supplies, by means of a multiplying member 39, the quantity $E_i$ which is expressed by:

$$E_i = \frac{\sum\limits_{k=1}^{i} n_k - d_k}{TBV}$$

The regulating circuit forces $E_i$ to the subsequent domain to satisfy the necessity of having a residual quantity less than TBV:

$$-\frac{1}{2} < E_i < +\frac{1}{2}$$

The correction circuit 28 applies a correction indicated by the formula (3). This formula is established on the following considerations:

In order to obtain a number $d_i$ for the block BL(i), it must be provided that the inverse of the quality is:

$$q^{-1} = \frac{n_i q_i^{-1}}{d_i}$$

In addition, the parameter $q^{-1}$ is modulated to guarantee a residual quantity $E_i$ which is as near as possible to 0.

If $E_i > 0$, there is an excess of bits, then q is diminished.

If $E_i < 0$, there is a shortage of bits, then q is increased. The result is that:

$$q^{-1} = \frac{n_i q_i^{-1}}{d_i(1 - \tau E_i)}$$

wherein $\tau$ fixes the convergence period (in practice $\tau = \frac{1}{2}$). This value $q^{-1}$ will act on the block BL(i+1), hence the formula (3):

$$q^{-1}_{i+1} = \frac{n_i q_i^{-1}}{d_i(1 - \tau E_i)} \quad (3)$$

This value $q^{-1}{}_{i+1}$ is obtained from a delay member 45 which produces the appropriate delay to provide that it is available for processing the block BL(i+1).

To improve the operation of a regulating circuit 17, a first filtering circuit 50 is provided which is connected to the output of the member 36. This circuit 50 supplies a filtered quantity $n_i q_i^{-1}$ defined by the following equation which is written with the aid of the operator Z of the z transform:

$$\overline{n_i q_i^{-1}} = \frac{1 - Q^1}{1 - Q_1 Z^{-1}} n_i q_i^{-1}$$

wherein $0 < p_1 < 1$.

This first filtering circuit 50 renders it possible to prevent disturbances produced by sudden changes in the local characteristics of the picture.

It is this quantity $n_i q_i^{-1}$ which is applied to the circuits 20, 22 and 28.

A second filtering circuit 52 is connected to the output of the circuit 28. Its transfer function, in accordance with the z transform notation is written:

$$\frac{1 - Q_2}{1 - Q_2 Z^{-1}}$$

wherein $0 < p2 < 1$. This second filtering circuit 52 ensures a slow variation of the parameter $q_i^{-1}$.

Figure 5:
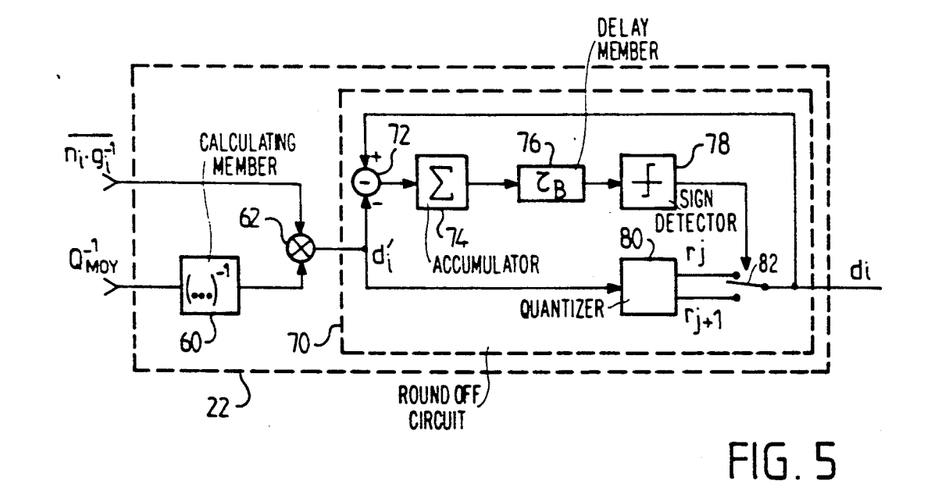
FIG. 5 is a detailed representation of another circuit of the arrangement of FIG. 1.

FIG. 5 is a detailed representation of the circuit 22. In addition to the members 60 and 62 used, the first member for calculating the inverse of the quantity $Q^{-1}_{MOY}$ and the second circuit for taking the product $(n_i q_i^{-1})$. $Q_{MOY}$, this circuit 22 includes a round-off circuit 70 for furnishing the value $d_i$.

This circuit includes a substracting member 72 for effecting the substraction of the quantity $d_i$ supplied by the quantity $d'_i$ developed by the member 62. The differences are added together in an accumulator 74; the result, after a delay equal to $\tau_B$ produced by a delay member 76, is applied to a sign detector 78. The quantity $d'_i$ developed by the member 62 is processed by a M-level quantizer 80; two consecutive levels $r_j$ and $r_{j+1}$ between which the value applied to its input is situated can be seen in FIG. 5. A change-over member 82 renders it possible for $d_i$ to take one of these levels in accordance with the following condition:

$$\text{If } \sum_{l=0}^{i-1} d'_l - d_l > 0 \text{ then } d_i = r_{j+1}$$

if not $d_i = r_j$.

Acting thus, a reduction is obtained in the derivative of $d'_i$ relative to the quantized version $d_i$.

A $d_{min}$ (for example 128 bits if each element of the block is encoded with 0.5 bit) corresponds to the first quantization level and $d_{MAX}$ (for example 512 bits if the elements of the block are each encoded with two bits) corresponds to the latter quantization circuit. The quantities $d_i$ are transferred to the terminal 12 via a multiplexer 90 which multiplexed these quantities with the output information components of the coder 10 before applying the total to the buffer store 15.

Figure 6:
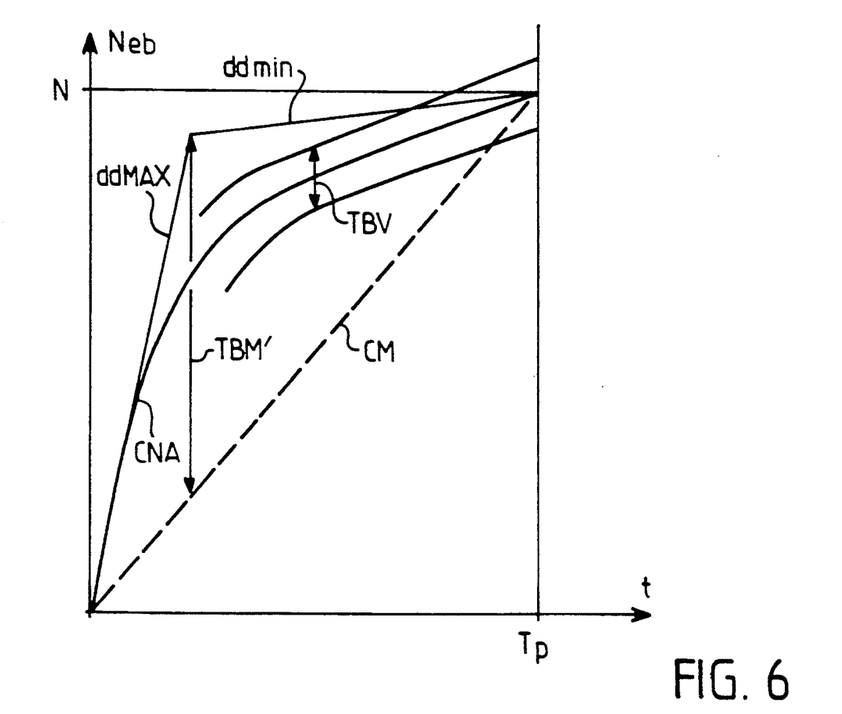
FIG. 6 shows, as a function of time, the development of the number of bits supplied by the coder, in accordance with the measures of the invention.

The FIG. 6, which shows the advantage provided by the invention must be compared with FIG. 3. The broken line curve is still the average curve CM. The curve CNA is the curve representing the analysis of the picture effected in accordance with an invariable quality $Q_{MOY}$. As this quality has been determined from the preceding picture, the analysis of the current picture can deviate on either side of this curve CNA. The range of the divergence is given by the parameter TBV. It will be noted that the curve CNA can deviate in a much more significant manner from the curve CM than the curve CPA of FIG. 3. The dimension TBM' which can be utilized for the buffer store 15 can be evaluated in the following manner:

a straight flow rate line $dd_{min}$ leading to the intersection of $t = T_p$ and the curve CM is associated with the value $d_{min}$.

a straight flow rate line $dd_{MAX}$ leading to the origin is associated with the value $d_{MAX}$.

The distance between the point of intersection of the straight lines $dd_{MAX}$ and $dd_{min}$ and the curve CM defines the dimension TBM'. When these two straight lines are inverted the same result is evidently obtained.

A further measure to improve the performances of the coding arrangement of the invention consists in a judicious scanning of the picture blocks. The important factor actually is that the blocks must be jointly analysed; their scan can be effected as indicated in FIG. 2 in the direction of the arrow FL.

The blocks are analysed line-by-line from left to right for the odd lines BL(1) to BL(K), . . . , BL(2K+1) to BL(3K) . . . and from right to left for the even lines BL(K+1) to BL(2K) etc. . . . It will be obvious that the direction can be inverted.

Figure 7:
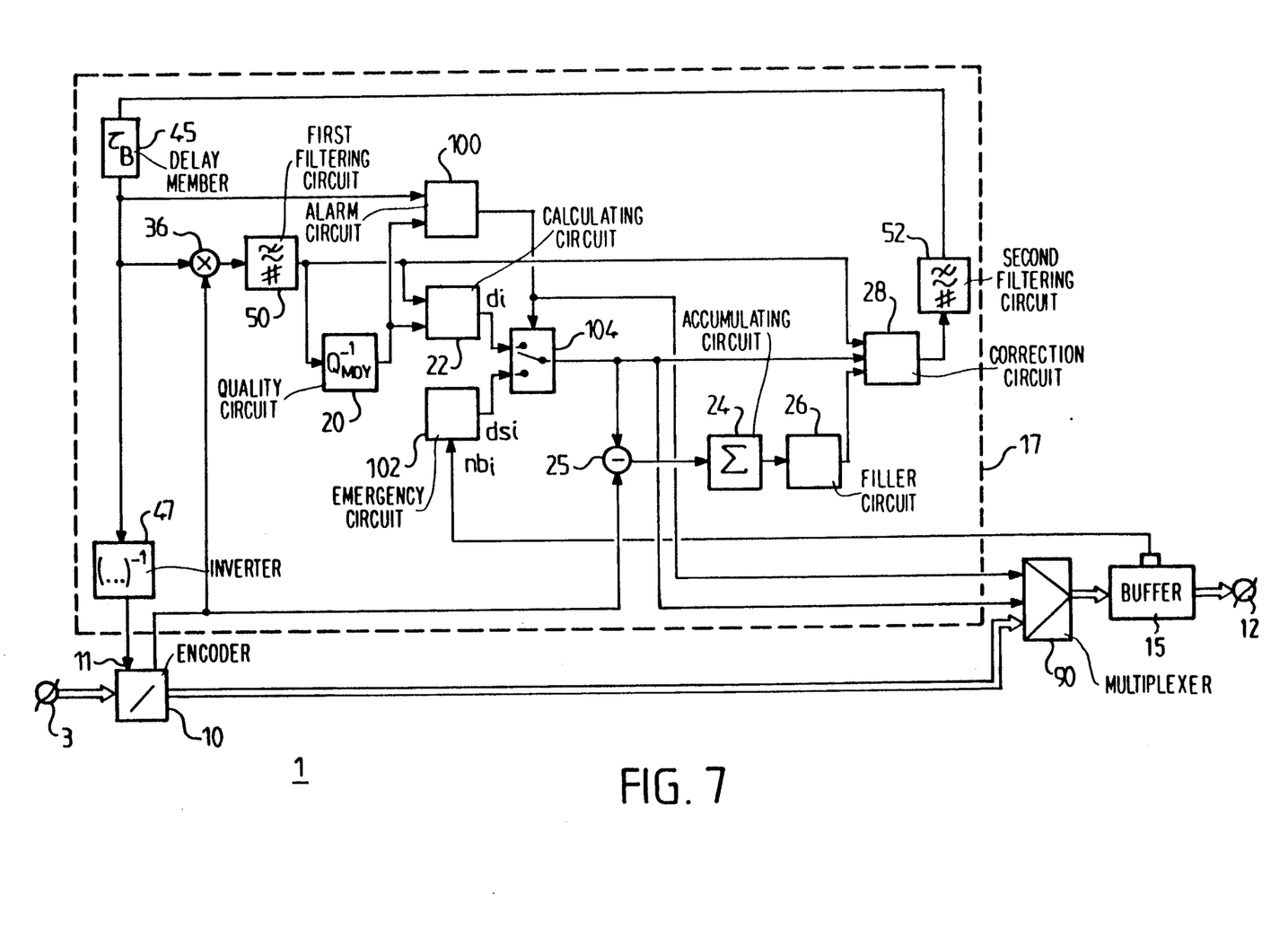
FIG. 7 shows a preferred embodiment of a coding arrangement in accordance with the invention.

In FIG. 7 a preferred embodiment is shown of a coding arrangement in accordance with the invention. The elements used in common with the elements already described are given the same reference numerals.

This coder differs from the coder shown in FIG. 1 in the presence of an alarm circuit 100. This circuit 100 supplies an alarm signal as soon as the difference between the inverse of the quality applied to the input of the circuit 47 and the value $Q^{-1}_{MOY}$ exceeds a predetermined value "Th". The appearance of this signal most often indicates that there is a rupture in the sequence, therefore, everything which has been determined for a picture is no longer valid for the picture subsequent thereto. One does no longer concentrate on the value given by the circuit 22 but on a value $ds_i$ supplied by an emergency circuit 102. The multiplexer 90 also transfers the alarm signal to the decoder.

A change-over switch 104 whose switching positions are controlled by the emergency signal allows a switching of the value $d_i$ or the value $ds_i$ towards the circuit 28.

Figure 8:
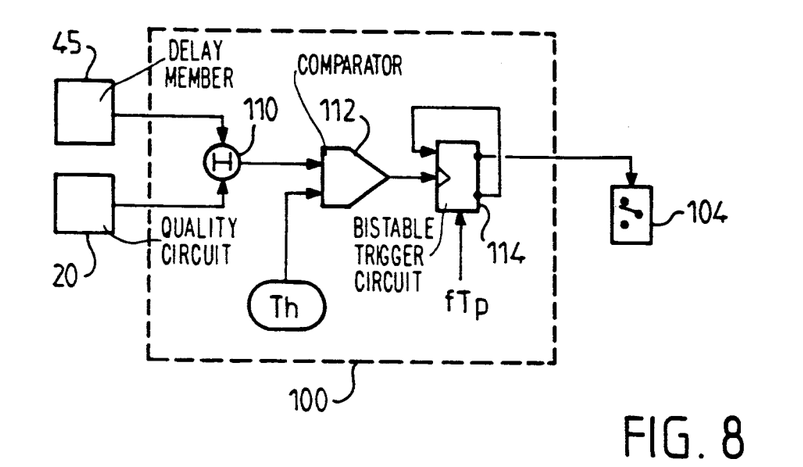
FIG. 8 is a detailed representation of a circuit of the arrangement of FIG. 7.

FIG. 8 is a detailed representation of the alarm circuit. It is comprised of a subtracting member which measures the differences between the values $q_{i+1}^{-1}$ and $Q^{-1}_{MOY}$ which are respectively supplied on the outputs of the circuits 45 and 20; the absolute value of these differences is compared with a preset value Th by means of a comparator 112; as soon as a difference exceeding the threshold Th is detected, a bistable trigger circuit 114 triggers the alarm signal. This bistable trigger circuit 116 is initialized by the signal $fT_p$ at each picture.

Figure 9:
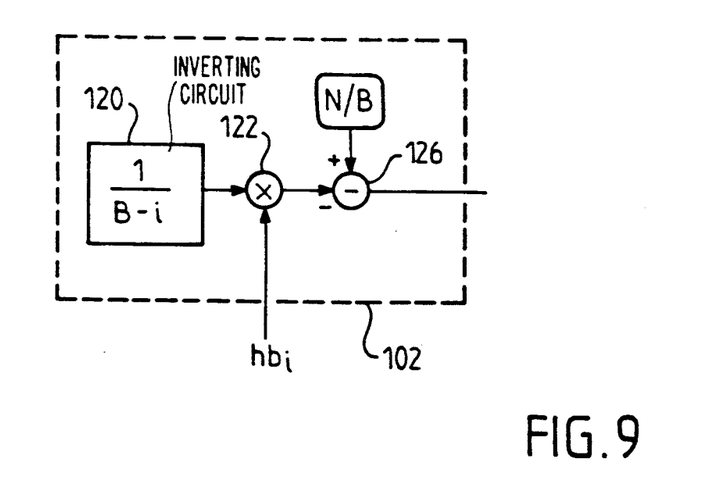
FIG. 9 is a detailed representation of another circuit of the arrangement of FIG. 7.

FIG. 9 is a detailed representation of the emergency circuit which establishes the number of bits $ds_i$ to be assigned to the blocks following after the appearance of the alarm signal. By means of a circuit 120 this circuit evaluates the inverse of the value of the remaining blocks to be processed. A multiplying member 122 establishes, using the quantity nbi, the number of bits to be assigned to each block; nbi is the quantity of bits remaining in the buffer store 15. The value furnished by the member 122 is subtracted, using the subtracting member 126, from the value N/B which represents the average number of bits to be assigned to each block for processing the picture.

Figure 10:
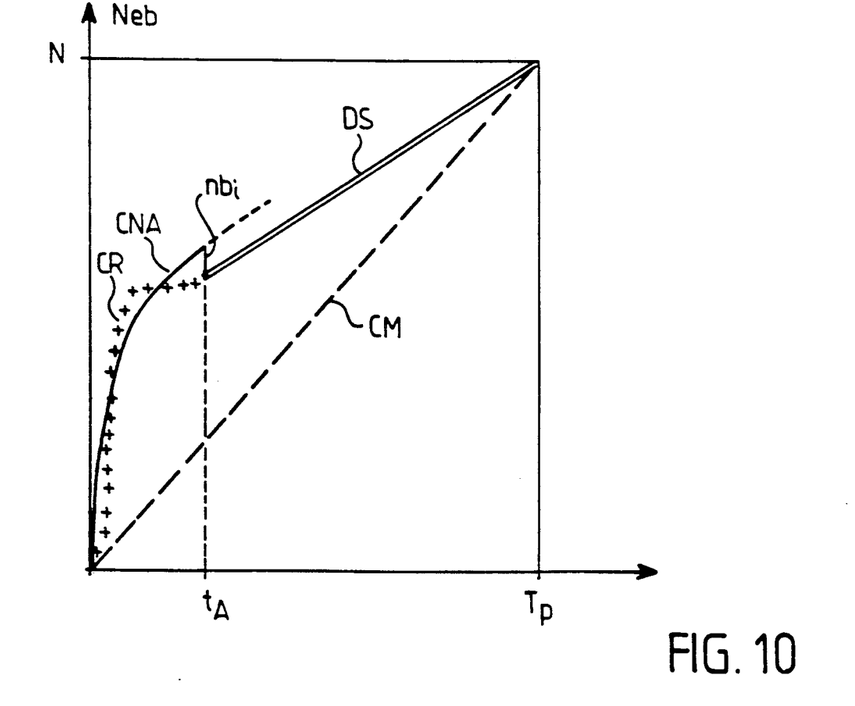
FIG. 10 shows, as a function of time, the development of the bit rate after an alarm signal has appeared.

Referring to FIG. 10, the effect is shown of the circuits 100 and 102 on the rate curve. The rear curve CR is represented by small crosses. Let the instant $t_4$ be the instant at which the alarm signal appears; before this instant one acts on the curve CNA, after this instant one acts on the straight line DS which leads to the intersection $t=T_p$, Neb=N starting from the point $t=t_4$ and from the curve CR which at this instant $t_4$ is at a distance from $nb_i$.

Figure 11:
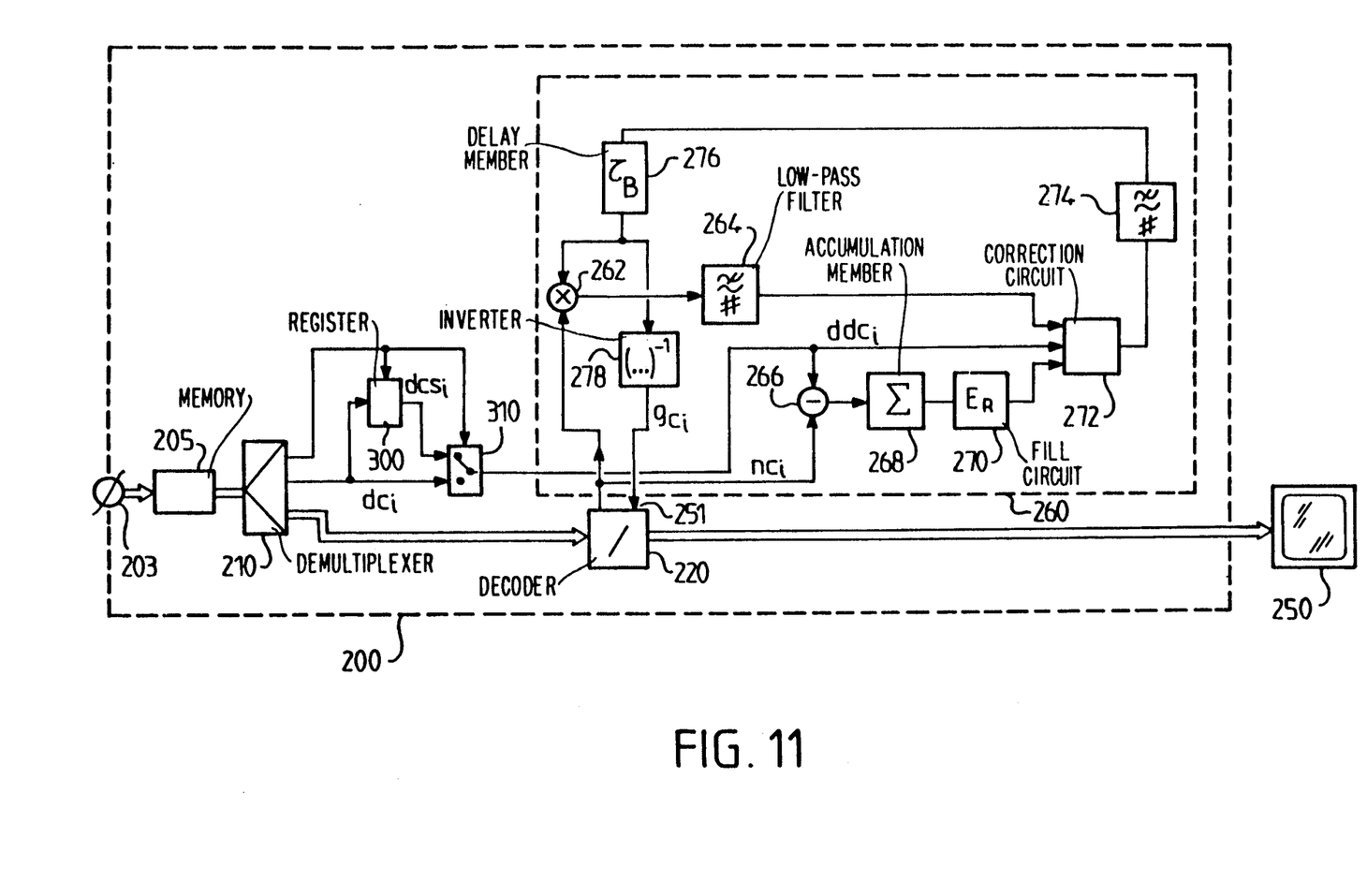
FIG. 11 shows a decoding device suitable for a coding arrangement shown in FIG. 1 or 7.

FIG. 11 shows a decoding circuit 200 associated with a coding circuit in accorance with the invention.

The data to be decoded are received at the level of an input terminal 203 which is connected to the input of a buffer memory 205. The information components related to $d_i$ and the information components relating to the pictures are demultiplexed at the output of the memory 205 by means of a demultiplexer 210. The information components referenced $dr_i$ represent the transmitted information components $d_i$. The data contained in this memory are taken therefrom at the rate of the decoding operation effected by the decoder 220 which performs the inverse operation of the coding member 10 of FIGS. 1 and 7.

The decoded data can then be utilized by a display member 250.

In the same manner as the coding member 10, the decoder member is provided with a quality control 251 which determines the quantization step in accordance with which the coding operation is effected. A decoding regulating circuit 260 supplies the values $qr_i$ to be applied to the control terminal 51 as a function of the number $nr_i$ of bits taken from the memory 210 for the decoding of a block and of the quantity $dr_i$ already explained.

This regulating circuit 260 is comprised of:
a multiplying member 262 for evaluating the product $qr_i^{-1} \cdot nr_i$,
a digital low-pass filter 264 for smoothing the fluctuations in this product,
a subtracting member 266 for evaluating the deviations between $dr_i$ and $nr_i$,
an accumulation member 268 for summing these deviations during a complete picture,
a fill circuit 270 for supplying a fill quantity $E_{ri}$ equivalent to the quantity $E_i$ of the circuit 26 (FIGS. 1 and 7),
a correction circuit 272 whose function is the same as that of the circuit 28.

The value supplied by the circuit 272 is filtered by the filter 274, delayed by the member 276 and inverted by the member 278 before being applied to the control 251.

The quantity $dr_i$ which appears at the output of the demultiplexer 210 can be transferred as it is to the circuit 260, or be recorded in a register 300 when the alarm signal is transferred. A changeover switch 310 applies a signal $ddr_i=dr_i$ to the regulating circuit 260 when there is no alarm signal or a signal $ddr_i=drs_i$ when the alarm signal appears. It should be noted that the value $ds_i$ remains fixed up to the end of the picture and might be defined with much precision.

This design of the decoding device induces the following remarks:

The information components qi (quality) determine the quantization steps utilized at the level of the coder. These information components are necessary at the level of the decoder to effect the inverse quantization. These information components are not transferred to the decoder: it is therefore sufficient to regenerate them. The quantities $q_i$ are calculated at the coder on the basis of $n_i$ (number of bits representing the block i) and $d_i$ (desired number of bits for the block). $n_i$ is available at the decoder side since it is equal to the number of bits $nr_i$ taken during the decoding of the block i, while $d_i$ is transmitted.

The sequence of quantities $q_i$ is consequently calculated at the level of the decoding device, as it was calculated at the level of the coding device. Thus the transmission of an excess of supplementary information components is avoided (overhead). It is nevertheless possible to consider the transmission of $q_i$ when the blocks are of a large dimension.

We claim:

1. A coding arrangement having an input for receiving packets of information blocks and an output terminal, said arrangement comprising:
   (a) a variable length coding means coupled to said input, for providing coded information at a coder output;
   (b) buffer means coupled to said coder output, for receiving said coded information and for providing said coded information at said output terminal at a fixed rate;
   (c) regulating means coupled to said variable length coding means and said buffer means, for defining for each information block, a quality value as a function of the real number of bits utilized by said variable length coding means to code the information block and a residual quantity defining the number of bits contained in the buffer means after said coding, said regulating means comprising in combination:
   i. means for determining an average quality for each packet of information blocks;
   ii. means for providing for each information block the number of bits corresponding to the average quality of its respective packet and for calculating for each information block a difference value between its said respective number of bits and the real number of bits of its respective packet;
   iii. means for accumulating for each packet, the difference values calculated for its respective information blocks;
   iv. means for supplying a fill quantity to said buffer means which represents the ratio between said accumulated difference values and said residual quantity; and
   v. means for supplying a corrected said average quality value as a function of said fill quantity.

2. A decoding arrangement having an input for receiving information coded by the coding arrangement described in claim 1, said arrangement comprising:
   (a) decoding means coupled to said input, for providing from said coded information, decoded data; and
   (b) means for providing a display from said decoded data.

3. A coding arrangement as claimed in claim 1, further comprising a detector for detecting a deviation between the quality value of each information block and the average quality of its respective packet so as to supply an alarm to said regulating means.

4. A decoding arrangement having an input for receiving information coded by the coding arrangement described in claim 3, said arrangement comprising:
   (a) decoding means coupled to said input, for providing from said coded information, decoded data; and
   (b) means for providing a display from said decoded data.

5. A coding arrangement as claimed in claim 1, wherein the analysis of an information block is effected after the evaluation of one of its neighboring information blocks.

6. A decoding arrangement having an input for receiving information coded by the coding arrangement described in claim 5, said arrangement comprising:
   (a) decoding means coupled to said input, for providing from said coded information, decoded data; and
   (b) means for providing a display from said decoded data.

7. A coding arrangement as claimed in claim 5, wherein a detector is proposed for detecting the deviation between the block quality value and the average quality to supply an alarm signal and in that a constant rate circuit is provided on which the regulating circuit acts as soon as the alarm signal appears.

8. A decoding arrangement having an input for receiving information coded by the coding arrangement described in claim 7, said arrangement comprising:
   (a) decoding means coupled to said input, for providing from said coded information, decoded data; and
   (b) means for providing a display from said decoded data.

9. A coding arrangement as claimed in claim 1, for which a block BL(i) is enclosed into $N_i$ bits, wherein the value of the average quality $Q_{MOY}$ is evaluated over a B information block picture:

$$Q^{-1}_{MOY} = i \frac{\sum\limits_{1}^{B} n_i q_i^{-1}}{N}$$

wherein $Q_i^{-1}$ is the inverse of the quality utilized for each information block, and N the total content of the bits dedicated to the encoding of the picture.

10. A decoding arrangement having an input for receiving information coded by the coding arrangement described in claim 9, said arrangement comprising:
   (a) decoding means coupled to said input, for providing from said coded information, decoded data; and
   (b) means for providing a display from said decoded data.

11. A coding arrangement as claimed in claim 9, wherein a detector is proposed for detecting the deviation between the block quality valve and the average quality to supply an alarm signal and in that a constant rate circuit is provided on which the regulating circuit acts as soon as the alarm signal appears.

12. A decoding arrangement having an input for receiving information ccoded by the coding arrangement described in claim 11, said arrangement comprising:
   (a) decoding means coupled to said input, for providing from said coded information, decoded data; and
   (b) means for providing a display from said decoded data.

13. A coding arrangement as claimed in claim 9, wherein the analysis of a block is effected after the evaluation of one of its neighboring blocks.

14. A decoding arrangement having an input for receiving information coded by the coding arrangement described in claim 13, said arrangement comprising:
   (a) decoding means coupled to said input, for providing from said coded information, decoded data; and
   (b) means for providing a display from said decoded data.

15. A coding arrangement as claimed in claim 13, wherein a detector is proposed for detecting the deviation between the block quality value and the average quality to supply an alarm signal and in that a constant rate circuit is provided on which the regulating ciorcuit acts as soon as the alarm signal appears.

16. A decoding arrangement having an input for receiving information coded by the coding arrangement described in claim 15, said arrangement comprising:
   (a) decoding means coupled to said input, for providing from said coded information, decoded data; and
   (b) means for providing a display from said decoded data.

* * * * *